(12) United States Patent
Barton et al.

(10) Patent No.: US 11,601,317 B2
(45) Date of Patent: Mar. 7, 2023

(54) ADAPTIVE GUARD INTERVAL CALIBRATION

(71) Applicant: Cisco Technology, Inc., San Jose, CA (US)

(72) Inventors: Robert E. Barton, Richmond (CA); Vishal Satyendra Desai, San Jose, CA (US); Indermeet Singh Gandhi, San Jose, CA (US); Jerome Henry, Pittsboro, SC (US)

(73) Assignee: Cisco Technology, Inc., San Jose, CA (US)

( * ) Notice: Subject to any disclaimer, the term of this patent is extended or adjusted under 35 U.S.C. 154(b) by 81 days.

(21) Appl. No.: 17/235,510

(22) Filed: Apr. 20, 2021

(65) Prior Publication Data
US 2022/0337466 A1 Oct. 20, 2022

(51) Int. Cl.
*H04L 27/26* (2006.01)
*H04W 24/02* (2009.01)
*H04W 84/12* (2009.01)

(52) U.S. Cl.
CPC ...... *H04L 27/2646* (2013.01); *H04L 27/2607* (2013.01); *H04W 24/02* (2013.01); *H04W 84/12* (2013.01)

(58) Field of Classification Search
CPC .......... H04L 27/2646; H04L 27/2607; H04W 24/02; H04W 84/12
See application file for complete search history.

(56) References Cited

U.S. PATENT DOCUMENTS

| | | | |
|---|---|---|---|
| 5,412,620 A * | 5/1995 | Cafarella | H04B 11/00 367/134 |
| 2006/0148414 A1 * | 7/2006 | Tee | H04B 17/336 455/69 |
| 2011/0176472 A1 | 7/2011 | Amini et al. | |
| 2016/0057656 A1 | 2/2016 | HomChaudhuri et al. | |
| 2017/0280439 A1 * | 9/2017 | Zhang | H04L 5/0055 |
| 2018/0062811 A1 | 3/2018 | Akkarakaran et al. | |
| 2018/0278308 A1 | 9/2018 | Jin et al. | |
| 2019/0007114 A1 | 1/2019 | Jaganathan et al. | |

* cited by examiner

*Primary Examiner* — Mohammad S Anwar
(74) *Attorney, Agent, or Firm* — Merchant & Gould P.C.

(57) ABSTRACT

Adaptive guard interval calibration may be provided. A computing device may receive a first plurality of delay spread values. Each of the first plurality of delay spread values may respectively comprise an amount of time between when each of a respective first plurality Access Points (APs) receives a first tuning symbol from a first calibrating AP and when each of the respective first plurality APs receives a final multipath reflection of the first tuning symbol. Next, a first Guard Interval (GI) may be determined based on the first plurality of delay spread values. The first calibrating AP may then be provisioned with the first GI.

20 Claims, 4 Drawing Sheets

ADAPTIVE GUARD INTERVAL CALIBRATION

TECHNICAL FIELD

The present disclosure relates generally to adaptive guard interval calibration.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
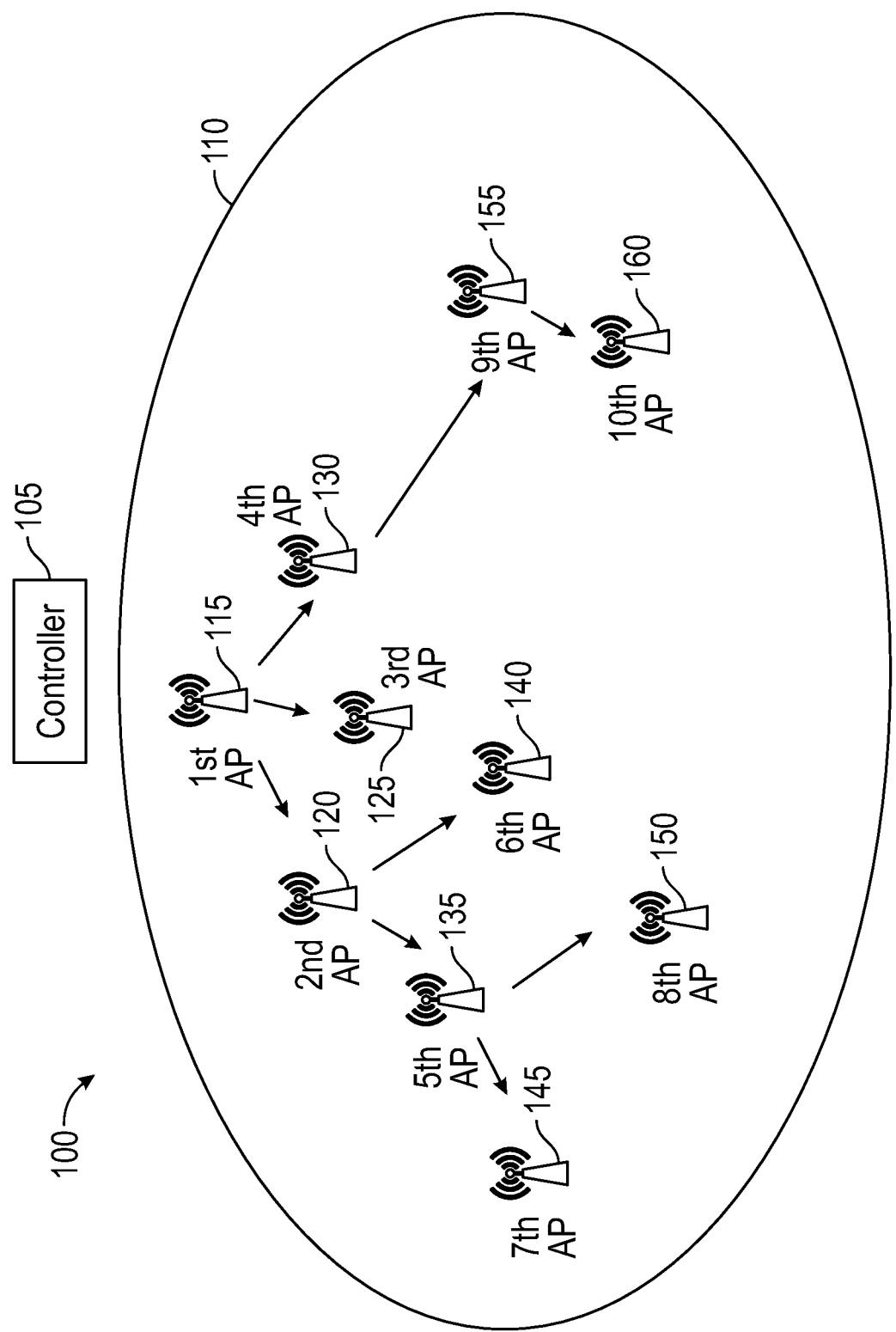
FIG. 1 is a block diagram of an operating environment for providing adaptive guard interval calibration.

Adaptive guard interval calibration may be provided. A computing device may receive a first plurality of delay spread values. Each of the first plurality of delay spread values may respectively comprise an amount of time between when each of a respective first plurality Access Points (APs) receives a first tuning symbol from a first calibrating AP and when each of the respective first plurality APs receives a final multipath reflection of the first tuning symbol. Next, a first Guard Interval (GI) may be determined based on the first plurality of delay spread values. The first calibrating AP may then be provisioned with the first GI.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

One goal of wireless may be to address improved performance in outdoor environments. A key issue in outdoor environments may comprise propagation conditions with delay spreads potentially longer than a Guard Interval (GI) defined by a standard, for example, of 0.8 μs. The GI may be used between symbols to allow enough time for multipath reflection propagation so as to avoid inter-symbol interference. While a standard GI (e.g., 0.8 μs) may work indoors where signal propagation may be limited, in outdoor environments propagation and multipath reflections may take longer (e.g., reflections off obstacles, high-speed vehicles, etc.), causing unexpected inference. To address this, some standards have modified the possible GI options, for example, to 0.8 μs, 1.6 μs, and 3.2 μs. These extended guard interval durations may allow for better protection against signal delay spread as it occurs in outdoor environments. Accordingly, embodiments of the disclosure may automatically tune a variable GI using listener APs that may measure a delay spread of a calibrating AP, then allowing a controller to optimize the GI of the calibrating AP in any environment.

FIG. 1 shows an operating environment 100 for providing adaptive guard interval calibration. As shown in FIG. 1, operating environment 100 may comprise a controller 105 and a coverage environment 110. Coverage environment 110 may comprise, but is not limited to, a Wireless Local Area Network (WLAN) comprising a plurality of Access Points (APs) that may provide wireless network access (e.g., access to the WLAN) for client devices. The plurality of APs may comprise a first AP 115, a second AP 120, a third AP 125, a fourth AP 130, a fifth AP 135, a sixth AP 140, a seventh AP 145, an eighth AP 150, a ninth AP 155, and a tenth AP 160. Coverage environment 110 may comprise an outdoor wireless environment, such as a mesh (e.g., a Wi-Fi mesh). Embodiments of the disclosure may also apply to non-mesh environments with unknown multipath or channel propagation characteristics.

As described in greater detail below with respect to FIG. 2, first AP 115 may comprise a first calibrating AP. Second AP 120, third AP 125, and fourth AP 130 may comprise a first plurality APs. Fifth AP 135 and sixth AP 140 may comprise a second plurality APs. Second AP 120 may comprise a second calibrating AP.

The plurality of APs may provide wireless network access to a plurality of client devices (not shown) as the plurality of client devices move within coverage environment 110. Ones of the plurality of client devices may comprise, but are not limited to, a smart phone, a personal computer, a tablet device, a mobile device, a telephone, a remote control device, a set-top box, a digital video recorder, an Internet-of-Things (IoT) device, a network computer, a router, or other similar microcomputer-based device. Each of the plurality of APs may be compatible with specification standards such as, but not limited to, the Institute of Electrical and Electronics Engineers (IEEE) 802.11ax specification standard for example.

Controller 105 may comprise a Wireless Local Area Network controller (WLC) and may provision and control coverage environment 110 (e.g., a WLAN). Controller 105 may allow the plurality of client devices to join coverage environment 110. In some embodiments of the disclosure, controller 105 may be implemented by a Digital Network Architecture Center (DNAC) controller (i.e., a Software-Defined Network (SDN) controller) that may configure information for coverage environment 110 in order to provide adaptive guard interval calibration.

The elements described above of operating environment 100 (e.g., controller 105, first AP 115, second AP 120, third AP 125, fourth AP 130, fifth AP 135, sixth AP 140, seventh AP 145, eighth AP 150, ninth AP 155, and tenth AP 160) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 5, the elements of operating environment 100 may be practiced in a computing device 500.

Figure 2:
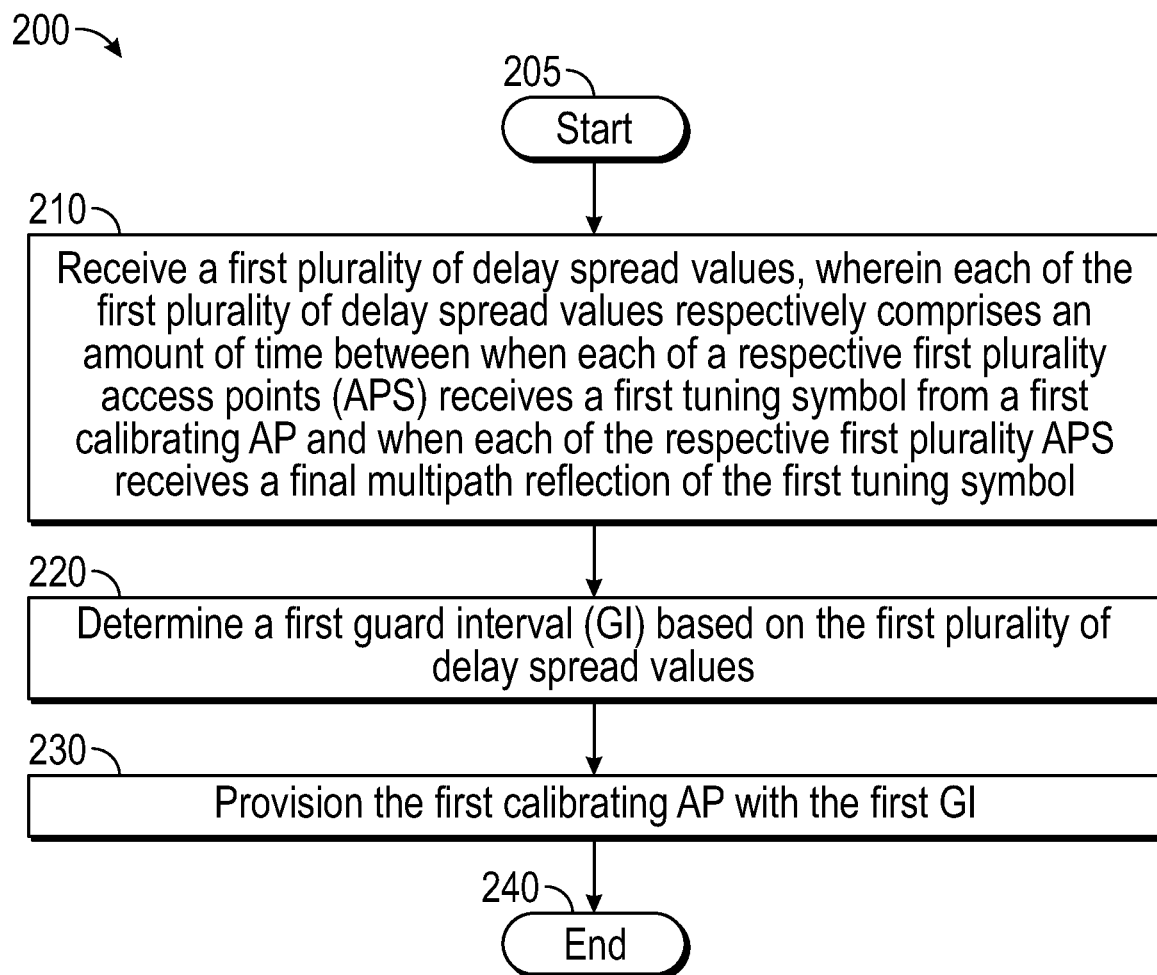
FIG. 2 is a flow chart of a method for providing adaptive guard interval calibration.

FIG. 2 is a flow chart setting forth the general stages involved in a method 200 consistent with embodiments of the disclosure for providing adaptive guard interval calibration. Method 200 may be implemented using, for example, first AP 115, second AP 120, or controller 105, any of which may be embodied by a computing device 500 as described in more detail below with respect to FIG. 5. Ways to implement the stages of method 200 will be described in greater detail below.

Method 200 may begin at starting block 205 and proceed to stage 210 where computing device 500 may receive a first plurality of delay spread values. Each of the first plurality of delay spread values may respectively comprise an amount of time between when each of a respective first plurality APs receives a first tuning symbol from the first calibrating AP and when each of the respective first plurality APs receives a final multipath reflection of the first tuning symbol. For example, first AP 115 may comprise the first calibrating AP. Second AP 120, third AP 125, and fourth AP 130 may comprise the first plurality APs.

Figure 3:
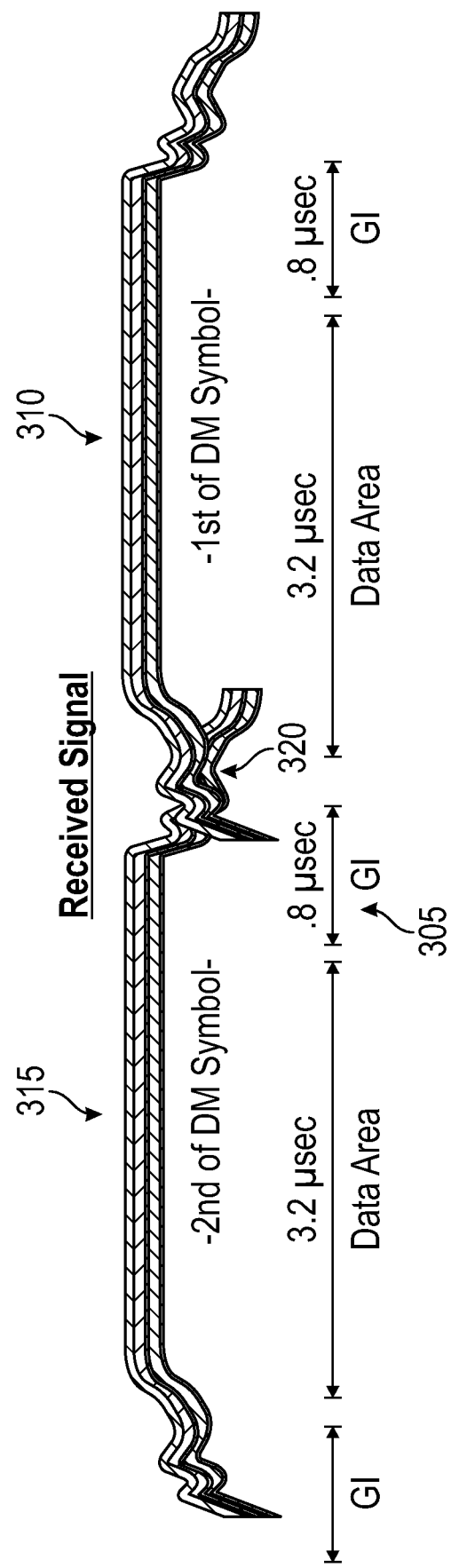
FIG. 3 is a diagram illustrating a Guard Interval (GI)

FIG. 3 is a diagram illustrating a GI 305. As shown in FIG. 3, GI 305 may be in place to protect successive symbols (e.g., a first symbol 310 and a second symbol 315) from interfering with each other. However, there may be a trade-off in performance verses a GI time that may be selected. For example, a 3.2 µs GI may result in longer time between symbols and protect against reflections 320 at longer range, however, the efficiency of the radio may only function at 88.9%. With a GI of 0.8 µs, the symbol transmission may be more aggressive, leading to improved efficiency of, for example, 95% (e.g., a 6.9% improvement), however, it may cause symbol interference issues in certain environments.

Between a plurality (e.g., three) of available GIs (e.g., 0.8 µs, 1.6 µs, and 3.2 µs), performance may vary significantly, however, there may be no reliable way to automatically tune or adjust the GI based on the physical environment. GI tuning may comprise a manual process, for example, engineers may either tune to a safer (e.g., 3.2 µs) GI, perhaps unnecessarily limiting the network performance, or keep the default (e.g., 0.8 µs), and potentially cause the network to suffer from performance degradation (e.g., especially for mesh networks). Accordingly, embodiments of the disclosure may provide processes to automatically tune the GI for any wireless environment.

Consistent with embodiments of the disclosure, at least two types of APs may be defined, calibrating APs (e.g., Root APs (RAPs)) and listener APs (e.g., Mesh APs (MAPs)). Additionally, controller 105 may play a role in analyzing a delay spread and selecting an optimal GI for each AP. Not all APs in the same network may be required to have the same GI, rather different GIs may be optimized for each AP's performance.

A calibrating AP in a mesh environment may begin by transmitting a sample tuning signal on a selected channel. The tuning signal may be transmitted symbol by symbol, leaving enough space between symbols to not cause multipath interference at a listener AP. Other APs may be configured to listen and receive the predefined tuning signal (e.g., a first tuning symbol). For example, in a Wi-Fi mesh, at a minimum a first level of child MAPs (e.g., the first plurality APs comprising second AP 120, third AP 125, and fourth AP 130) may hear the tuning signal (e.g., the first tuning symbol) from the RAP (e.g., first AP 115). MAPs deeper in the network may or may not be able to hear the predefined tuning signal due to RF visibility, however MAPs that may have a direct link to the RAP may hear the predefined tuning signal. The predefined tuning signal may be sent at an initial calibration phase, or sent at intervals.

Figure 4:
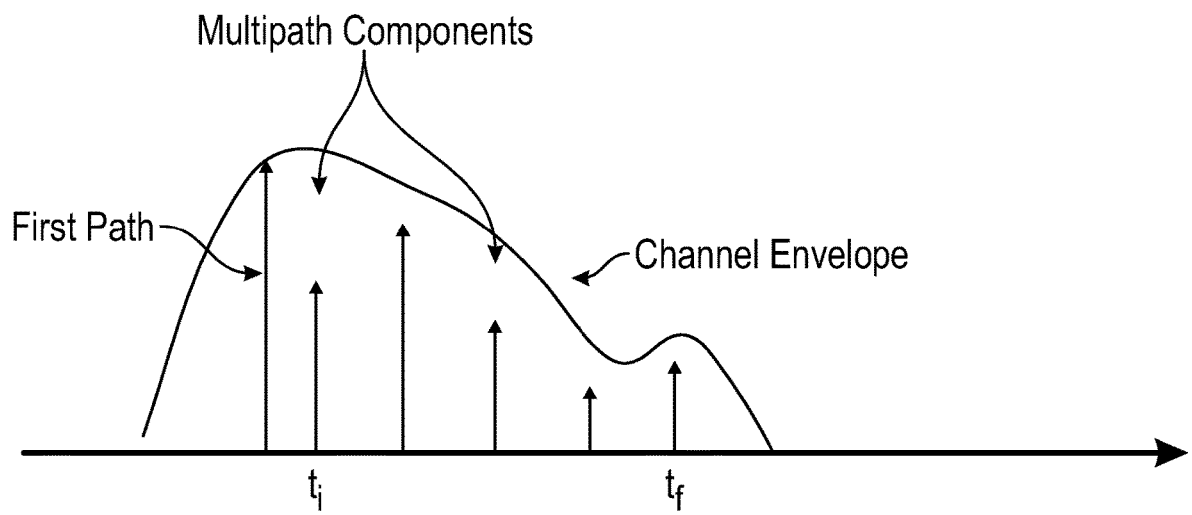
FIG. 4 is a diagram illustrating a delay spread for a channel envelop.

As illustrated by FIG. 4, when the listening APs (e.g., each of second AP 120, third AP 125, and fourth AP 130) first receive the tuning signal (e.g., first tuning symbol) from the calibrating AP (e.g., first AP 115), they may make a timestamp record ($t_i$) when the first tuning symbol is heard (i.e., on a first path). They continue listening for multipath reflection components for the first tuning symbol. When the final multipath reflection component is heard above a pre-set power threshold (i.e., a level that may be considered as the interference threshold), a final timestamp may be recorded ($t_f$). The calibrating AP (e.g., first AP 115) may compute the delay spread ($t_i$-$t_f$) and communicate this back to controller 105. This may be done for each of the first plurality APs (e.g., second AP 120, third AP 125, and fourth AP 130). In other words, all listening APs (e.g., second AP 120, third AP 125, and fourth AP 130) may report their delay spread measurements of the same tuning signal (e.g., first tuning symbol). The listening APs may report the delay spread mean, standard deviation, and min/max for all tuning symbols in the exchange.

From stage 210, where computing device 500 receives the first plurality of delay spread values, method 200 may advance to stage 220 where computing device 500 may determine a first GI based on the first plurality of delay spread values. For example, computing device 500 may examine the aggregate delta information from each listening AP (e.g., the first plurality APs comprising second AP 120, third AP 125, and fourth AP 130) and may use this to set an optimal GI for the calibrating AP (e.g., first AP 115) that may allow the listening APs to receive the signal without interference. This may be the maximum delay spread seen from the listening APs for a target link rank, once outliers are discarded. For example, if the RAP (e.g., first AP 115) is sending the tuning signal (e.g., first tuning symbol), three MAP listening APs (e.g., the first plurality APs comprising second AP 120, third AP 125, and fourth AP 130) one hop from the RAP (e.g., first AP 115) may reported deltas (i.e., delay spreads) as follows:

second AP 120: 1.57 μs;

third AP 125: 1.34 μs; and fourth AP 130: 0.68 μs.

In this case, the maximum of 1.57 μs may be used to select the nearest, from available GIs (e.g., 0.8 μs, 1.6 μs, and 3.2 μs), that supports this delay spread, namely, the 1.6 μs GI. The optimal delay spread implementation process may be implementation-specific, and may take various values (e.g., maximum likelihood, highest mean, highest reported value, etc.).

Once computing device 500 determines the first GI based on the first plurality of delay spread values in stage 220, method 200 may continue to stage 230 where computing device 500 may provision the first calibrating AP with the first GI. For example, based on the example above, computing device 500 may calibrating the AP's (e.g., first AP 115's) GI to 1.6 μs to avoid any interference among the listening APs. In another embodiment, computing device 500 may modify the interference threshold so that certain weak reflections with a larger delay spread may be ignored, allowing a shorter GI in certain situations, thus improving overall performance. Once computing device 500 provisions the first calibrating AP with the first GI in stage 230, method 200 may then end at stage 240.

The same process may be repeated for each listening AP and hop in coverage environment 110, one at a time, each one reporting the delay spread to the computing device 500 for example. In coverage environment 110, each MAP may perform the same exercise, becoming a calibrating AP while other lower hop APs are listening APs. In this case, both the parent RAP/MAPs as well as children may report their delay spread. As each calibrating AP completes, computing device 500 may set the GI individually to an AP and a particular hop (i.e., link), thus optimizing the wireless efficiency of each AP individually and each link. For an AP communicating with a multiple set of others (broadcast/multicast), the largest GI for the listening AP set may be chosen.

In other embodiments, sensor APs may be used as listeners and placed in locations to measure the delay spread where clients are likely to be (either in mesh or non-mesh environments). Similar to the listener APs described above, these would report the delay spread to computing device 500 for the calibrating AP.

Figure 5:
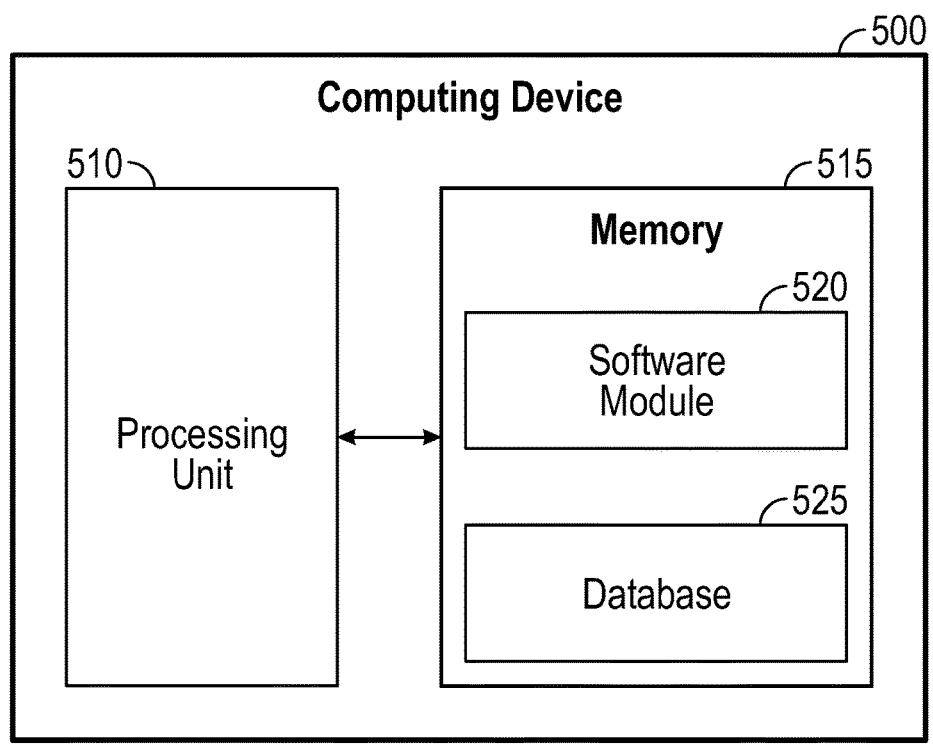
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing adaptive guard interval calibration as described above with respect to FIG. 2. Computing device 500, for example, may provide an operating environment for controller 105, first AP 115, second AP 120, third AP 125, fourth AP 130, fifth AP 135, sixth AP 140, seventh AP 145, eighth AP 150, ninth AP 155, or tenth AP 160. Controller 105, first AP 115, second AP 120, third AP 125, fourth AP 130, fifth AP 135, sixth AP 140, seventh AP 145, eighth AP 150, ninth AP 155, or tenth AP 160 may operate in other environments and are not limited to computing device 500.

Computing device 500 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   receiving a first plurality of delay spread values, wherein each of the first plurality of delay spread values respectively comprises an amount of time between when each of a respective first plurality Access Points (APs) receives a first tuning symbol from a first calibrating AP and when each of the respective first plurality APs receives a final multipath reflection of the first tuning symbol;
   determining a first Guard Interval (GI) based on the first plurality of delay spread values; and
   provisioning the first calibrating AP with the first GI.

2. The method of claim 1, further comprising:
   receiving a second plurality of delay spread values, wherein each of the second plurality of delay spread values respectively comprises an amount of time between when each of a respective second plurality Access Points (APs) receives a second tuning symbol from a second calibrating AP and when each of the respective second plurality APs receives a final multipath reflection of the second tuning symbol, wherein the second calibrating AP comprises one of the first plurality APs;
   determining a second GI based on the second plurality of delay spread values; and
   provisioning the second calibrating AP with the second GI.

3. The method of claim 1, wherein determining the first GI based on the first plurality of delay spread values comprises setting the first GI to be one of greater than a greatest of the first plurality of delay spread values and equal to the greatest of the first plurality of delay spread values.

4. The method of claim 1, wherein the first calibrating AP is configured to be provisioned with one of a plurality of predetermined GIs and where determining the first GI based on the first plurality of delay spread values comprises determining the first GI to be equal to a one the plurality of predetermined GIs that is greater than and closest to a greatest of the first plurality of delay spread values.

5. The method of claim 1, wherein the final multipath reflection of the first tuning symbol is defined by a predetermined power threshold.

6. The method of claim 1, wherein receiving the first plurality of delay spread values and determining the first GI is performed by a controller.

7. The method of claim 1, wherein receiving the first plurality of delay spread values, determining the first GI, and provisioning the first calibrating AP with the first GI is performed by the first calibrating AP.

8. A system comprising:
   a memory storage; and
   a processing unit, the processing unit coupled to the memory storage, wherein the processing unit is operative to:
      receive a first plurality of delay spread values, wherein each of the first plurality of delay spread values respectively comprises an amount of time between when each of a respective first plurality Access Points (APs) receives a first tuning symbol from a first calibrating AP and when each of the respective first plurality APs receives a final multipath reflection of the first tuning symbol;
      determine a first Guard Interval (GI) based on the first plurality of delay spread values; and
      provision the first calibrating AP with the first GI.

9. The system of claim 8, wherein the processing unit is further operative to:
   receive a second plurality of delay spread values, wherein each of the second plurality of delay spread values respectively comprises an amount of time between when each of a respective second plurality Access Points (APs) receives a second tuning symbol from a second calibrating AP and when each of the respective second plurality APs receives a final multipath reflection of the second tuning symbol, wherein the second calibrating AP comprises one of the first plurality APs;
   determine a second GI based on the second plurality of delay spread values; and
   provision the second calibrating AP with the second GI.

10. The system of claim 8, wherein determining the first GI based on the first plurality of delay spread values comprises setting the first GI to be one of greater than a greatest of the first plurality of delay spread values and equal to the greatest of the first plurality of delay spread values.

11. The system of claim 8, wherein the first calibrating AP is configured to be provisioned with one of a plurality of predetermined GIs and where determining the first GI based on the first plurality of delay spread values comprises determining the first GI to be equal to a one the plurality of predetermined GIs that is greater than and closest to a greatest of the first plurality of delay spread values.

12. The system of claim 8, wherein the final multipath reflection of the first tuning symbol is defined by a predetermined power threshold.

13. The system of claim 8, wherein receiving the first plurality of delay spread values and determining the first GI is performed by a controller.

14. The system of claim 8, wherein receiving the first plurality of delay spread values, determining the first GI, and provisioning the first calibrating AP with the first GI is performed by the first calibrating AP.

15. A non-transitory computer-readable medium that stores a set of instructions which when executed perform a method executed by the set of instructions comprising:
receiving a first plurality of delay spread values, wherein each of the first plurality of delay spread values respectively comprises an amount of time between when each of a respective first plurality Access Points (APs) receives a first tuning symbol from a first calibrating AP and when each of the respective first plurality APs receives a final multipath reflection of the first tuning symbol;
determining a first Guard Interval (GI) based on the first plurality of delay spread values; and
provisioning the first calibrating AP with the first GI.

16. The non-transitory computer-readable medium of claim 15, further comprising:
receiving a second plurality of delay spread values, wherein each of the second plurality of delay spread values respectively comprises an amount of time between when each of a respective second plurality Access Points (APs) receives a second tuning symbol from a second calibrating AP and when each of the respective second plurality APs receives a final multipath reflection of the second tuning symbol, wherein the second calibrating AP comprises one of the first plurality APs;
determining a second GI based on the second plurality of delay spread values; and
provisioning the second calibrating AP with the second GI.

17. The non-transitory computer-readable medium of claim 15, wherein determining the first GI based on the first plurality of delay spread values comprises setting the first GI to be one of greater than a greatest of the first plurality of delay spread values and equal to the greatest of the first plurality of delay spread values.

18. The non-transitory computer-readable medium of claim 15, wherein the first calibrating AP is configured to be provisioned with one of a plurality of predetermined GIs and where determining the first GI based on the first plurality of delay spread values comprises determining the first GI to be equal to a one the plurality of predetermined GIs that is greater than and closest to a greatest of the first plurality of delay spread values.

19. The non-transitory computer-readable medium of claim 15, wherein the final multipath reflection of the first tuning symbol is defined by a predetermined power threshold.

20. The non-transitory computer-readable medium of claim 15, wherein receiving the first plurality of delay spread values and determining the first GI is performed by a controller.

* * * * *